(12) United States Patent
Johnson et al.

(10) Patent No.: US 6,439,731 B1
(45) Date of Patent: *Aug. 27, 2002

(54) FLAT PANEL LIQUID CRYSTAL DISPLAY

(75) Inventors: Rick Johnson, Marion, IA (US); Steve Wolfe, Olathe, KS (US); Keith Deutch, Shawnee Mission, KS (US); Scott Hoffman, Bashor, KS (US); Darrell Henke, Olathe, KS (US); Saied Barakchi, Shawnee Mission, KS (US)

(73) Assignee: Honeywell International, Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/384,137

(22) Filed: Aug. 27, 1999

Related U.S. Application Data

(60) Provisional application No. 60/127,886, filed on Apr. 5, 1999.

(51) Int. Cl.[7] .............................................. G01D 11/28
(52) U.S. Cl. .................. 362/29; 362/812; 362/800; 362/230; 362/561; 349/61
(58) Field of Search .................................. 362/230, 231, 362/246, 355, 800, 29, 812, 561; 349/61, 64, 62; 257/79, 80, 81, 84, 88, 89, 98; 359/247

(56) References Cited

U.S. PATENT DOCUMENTS

| | | | | |
|---|---|---|---|---|
| 3,940,756 A | * | 2/1976 | Findlay | 345/82 |
| 4,573,766 A | | 3/1986 | Bournay, Jr. et al. | 350/345 |
| 5,375,039 A | * | 12/1994 | Weisa | 361/720 |
| 5,426,446 A | * | 6/1995 | Takei | 345/82 |
| 5,659,297 A | * | 8/1997 | Tatavoosian | 340/815.4 |
| 5,739,800 A | * | 4/1998 | Lebby | 345/82 |
| 6,007,209 A | * | 12/1999 | Pelka | 362/30 |

FOREIGN PATENT DOCUMENTS

| | | | | |
|---|---|---|---|---|
| WO | WO 94/00793 | 1/1994 | ......... | G02F/1/1335 |
| WO | WO 95/10066 | 4/1995 | ......... | G02F/1/1335 |

* cited by examiner

*Primary Examiner*—Sandra O'Shea
*Assistant Examiner*—Hargobind S. Sawhney

(57) ABSTRACT

A device and method for backlighting a liquid crystal display device using an array of light emitting diodes mounted in a cavity behind the liquid crystal display.

19 Claims, 2 Drawing Sheets

FLAT PANEL LIQUID CRYSTAL DISPLAY

This application claims the benefit of U.S. Provisional Application Serial No. 60/127,886, filed in the names of Rick Johnson, Steve Wolfe, Keith Deutch, Scott Hoffman, Darrell Henke, and Saied Barakchi on Apr. 5, 1999, the disclosure of which is incorporated herein in its entirety by reference.

FIELD OF THE INVENTION

The invention relates to liquid crystal display devices, and more particularly to backlighting of such liquid crystal display devices.

BACKGROUND OF THE INVENTION

The liquid crystal display, more commonly known as LCD, is well known to those of ordinary skill in the art. As briefly described in U.S. Pat. No. 5,046,829, Liquid Crystal Display Backlighting Apparatus Having Combined Optical Diffuser And Shock Dampening Properties, issued to Worp on Sep. 10, 1991, the complete disclosure of which is incorporated herein by reference, the LCD is made up of cells containing a thin layer of liquid crystal material between a plurality of segmentary electrodes. An electric field applied between the electrodes of any one of the segmentary electrodes causes the liquid crystal material therebetween to align with the electric field, and the light that passes through the polarizer on one side of the liquid crystal material is absorbed by the polarizer on the opposing side of the material, such that the absorbing polarizer appears "on."

Some LCD devices absorb or reflect ambient light impinging on the display face from outside the device. Therefore, ambient sun light or room light is required to view the display. These passive LCD devices have advantages of low power consumption combined with low weight and cost. Generally, however, passive LCD devices are inefficient in low ambient light conditions or at night. Therefore, LCD devices intended for low light conditions use internally supplied supplemental illumination. In a simple supplemental illumination system, one or more light sources, usually incandescent lamps, are placed behind the display, i.e., backlighting the display. One disadvantage of these simple supplemental illumination systems is lack of uniformity in the illumination. Incandescent lamps create localized "hot spots" which reduce the display's readability. While an optical diffusion panel placed between the illumination source and the display more evenly distributes the light from the internal sources and helps correct "hot spots," unevenness in brightness is unavoidable absent some natural diffusion. Natural diffusion requires sufficient space between the illumination source and the display. However, thinness is a requirement of automobile dashboard or aircraft control panel displays which does not permit sufficient space for natural diffusion. One solution presented in U.S. Pat. No. 4,649,381, Liquid Crystal Panel Display Device, issued to Masuda et al. on Mar. 10, 1987, the complete disclosure of which is incorporated herein by reference, divides the display panel into "display blocks," each displaying information in different small sectors of the panel, each sector including its own dedicated illumination source behind the respective panel sector and an optical diffuser shared by all of the panel sectors. While dividing the panel into discrete sectors may result in sufficiently uniform illumination within each sector, such discrete sectors do not address the problem presented by a full screen graphical or textual display. Another disadvantage of the divided display is the complete loss of information in any discrete sector if the illumination source fails in that sector of the display.

Another disadvantage of incandescent lamps is the high energy costs of powering the lamps. Today, many LCD devices use florescent lamps to control energy costs. However, florescent lamps are subject to the same unevenness in illumination from which incandescent lamps suffer. Also, florescent lamps present additional drawbacks. For example, more sophisticated LCD devices include the ability to adapt the display's light level to the ambient conditions. An automobile dashboard or aircraft control panel display usually includes a dimmer switch for adjusting the display brightness to a comfortable viewing level. Florescent lamps, however, require complex and expensive circuitry to adjust, or dim, the brightness of the supplemental internal illumination.

Another supplemental illumination configuration is side, or peripheral, lighting, which provides illumination at the sides of the display and uses a light guide to illuminate the interior portions of the display. Clearly, side lighting results in an unacceptably dark or under-lighted area in the central portion of a large area display due, at least in part, to attenuation at the illumination panel. In particular, in a large area LCD display, the central portion of the display remote from the illumination source is inevitably darker than the peripheral areas adjacent to the illumination source. To date, light guides in various configurations have attempted to adequately distribute the illumination rays across the display surface, as disclosed, for example, by U.S. Pat. No. 4,714,983, Uniform Emission Backlight, issued to Lang on Dec. 22, 1987; U.S. Pat. No. 4,929,062, Light Guide For LCD, issued to Guzik et al. on May 29, 1990; U.S. Pat. No. 4,729,185, Display Panel Illumination Device, issued to Baba on Mar. 8, 1988, the complete disclosures of which are incorporated herein by reference; and above incorporated U.S. Pat. No. 5,046,829. Such light guides are generally unsuccessful in providing uniform illumination of the display.

More recently, supplemental illumination has been provided using light emitting diodes, or LEDs. While the useful life or mean-time-between-failures (MTBF), is estimated at ten times (10x) or more of florescent lamps, the current high cost of LEDs has restricted their use to configurations using side lighting in combination with light guides, as disclosed for example by above incorporated U.S. Pat. No. 5,046,829. These attempts suffer the same limitation as light guides used with incandescent and florescent lamps: side lighting results in an unacceptably dark area in the central portion of a large area display remote from the illumination source.

Furthermore, side lighting of LCD displays with white light was previously possible using a mixture differently colored LEDs, i.e., using a mixture of LEDs radiating the three primary colors, the combination of which appears as white light to the viewer. However, LEDs radiating at some wavelengths are more expensive than those radiating at others due to differences in the chemical ingredients and manufacturing processes required to develop florescence at the proper wavelength. Therefore, the cost savings normally available from mounting a large number of same colored LEDs in a circuit has been unavailable in a white lighted LCD display.

Thus, until now, the long-felt need for a practical low cost, thin or low profile, backlighted large display LCD device having long lamp life, a high degree of illumination uniformity and simple brightness adjustment circuitry has been unattainable due to the nonuniformity of illumination using either florescent or incandescent lamps to illuminate large displays, even when combined with optical diffusers or light guides; the complex circuitry required to adjust brightness using florescent lamps; and the relatively high cost of colored LEDs. Furthermore, the long-felt need for such a practical low cost, thin or low profile, backlighted large display LCD device having white colored supplemental illumination sources has been unattainable due to the need to mix various differently colored LEDs to provide white side or back lighting.

SUMMARY OF THE INVENTION

The present invention overcomes display nonuniformity, display brightness control circuitry complexity, high cost, and short lamp life limitations of the prior art by providing a liquid crystal display device having essentially uniform backlighting in a flat panel display provided by multiple light emitting diodes mounted in backlighting relationship with a conventional liquid crystal display panel. The light emitting diodes providing a mean-time-between-failures, or MTBF, estimated at ten times (10x) that of prior florescent lamps. Furthermore, the illumination level or brightness of the light emitting diodes provided by the present invention is controlled by a relatively simple and less expensive circuit as compared with the circuit necessary for controlling the illumination level of the prior lamps.

According to one aspect of the present invention, the backlighted liquid crystal display device includes an optical chamber having two opposing spaced apart faces with a liquid crystal display panel mounted on one of the two faces and a printed circuit board mounted to the other of the two faces. Multiple light emitting diodes are arranged in a two-dimensional spatially uniform row and column array across essentially the entirety of the surface of the printed circuit board which is mounted to the optical chamber. The light emitting diode array thus mounted backlights the liquid crystal display. Preferably, the light emitting diodes radiate white light. Either each of the light emitting diodes radiates white colored light or the light emitting diodes are a mixture of light sources radiating in different ones of the three primary color bands, such that the combination of light emitting diodes generates white light.

According to another aspect of the present invention, the backlighted liquid crystal display device includes a brightness adjusting circuit electrically coupled to the light emitting diodes, the brightness adjusting circuit being relatively simple as compared with the complexity of a brightness adjusting circuit designed to control the light level of the florescent lamps of prior devices.

According to another aspect of the present invention, the backlighted liquid crystal display device includes a an optical diffusion panel mounted adjacent the light emitting diodes opposite the printed circuit board, i.e., between the light sources and the liquid crystal display panel. The optical diffusion panel forms a layered illumination assembly with the printed circuit board and light emitting diodes.

According to still another aspect of the present invention, the backlighted liquid crystal display device includes an optional heat sink mounted adjacent said printed circuit board opposite said light emitting diodes. Alternatively, the cooling function of the heat sink is performed by an optional fan mounted on or near the backlighted liquid crystal display device.

According to another aspect of the present invention, the surface of the printed circuit board having the light emitting diodes arranged thereon further includes a light-reflective finish formed thereon. Preferably, the internal surfaces of the optical chamber are also formed with a light-reflective finish.

According to still another aspect of the present invention, the invention provides a layered illumination assembly for mounting in a backlighting relationship with a liquid crystal display panel in a liquid crystal display device. Accordingly, the invention provides a two-dimensional arrangement of light emitting diodes mounted on one surface of a printed circuit board, the arrangement of light emitting diodes essentially filling the entirety of the surface; an optical diffusion panel mounted adjacent to the light emitting diodes opposite the printed circuit board; and an optional heat sink mounted adjacent the surface of the printed circuit board opposite the optical diffusion panel.

According to yet another aspect of the present invention, the invention provides a method of backlighting a liquid crystal display panel with white light using multiple light emitting diodes by mounting a liquid crystal display panel on one surface of an optical chamber; mounting the multiple light emitting diodes in a two-dimensional array essentially covering the surface of a printed circuit board, the light emitting diodes generating an essentially white colored light; mounting the printed circuit board on a surface of the optical chamber in a backlighting relationship to and spaced away from the liquid crystal display panel; and backlighting the liquid crystal display panel with an essentially uniform illumination.

According to various other aspects of the present invention, the method of the invention also provides a heat dissipating device mounted in layered relationship with the printed circuit board opposite to the light emitting diodes; an optical diffusing device mounted in layered relationship with the printed circuit board and the heat dissipating device opposite the heat dissipating device; and a brightness adjusting circuit coupled to the light emitting diodes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

The present invention is a large flat panel liquid crystal display, or LCD, device having essentially uniform white backlighted illumination using light emitting diodes, or LEDs.

Figure 1:
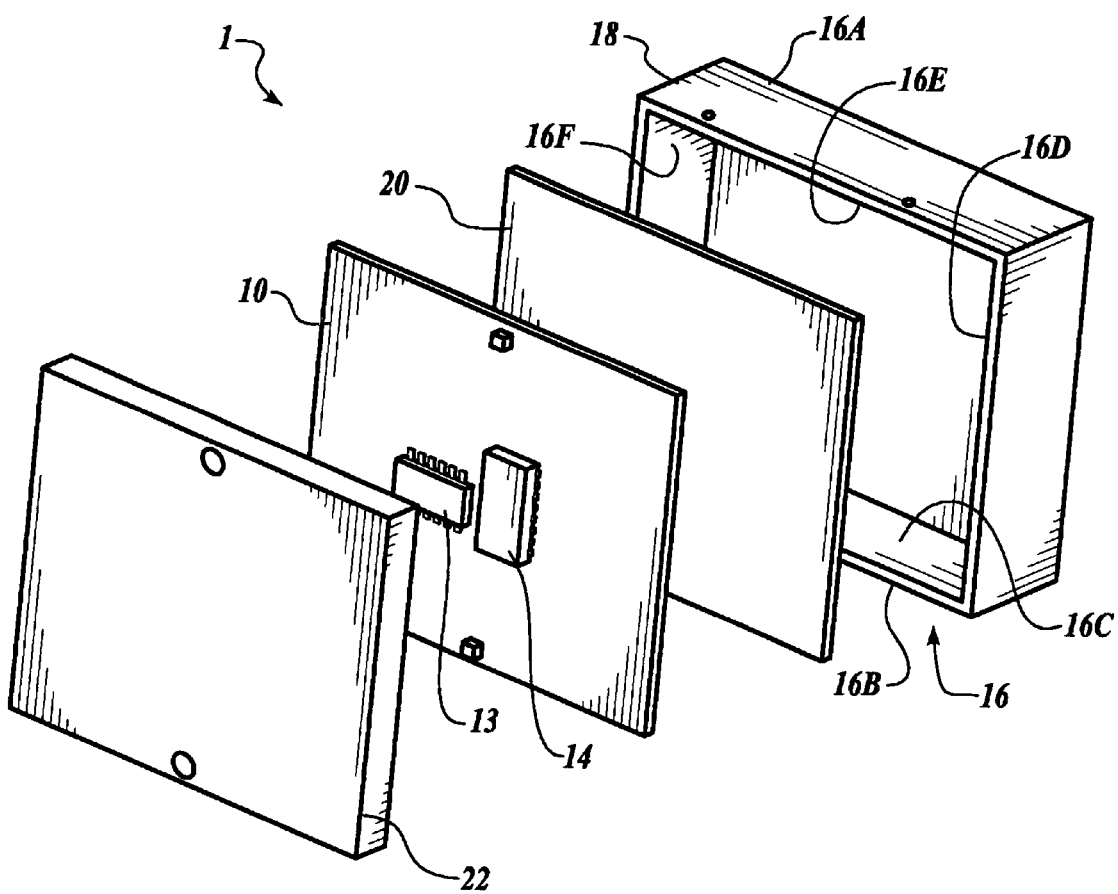
FIG. 1 is an exploded view of the LCD device of the invention.
Figure 2:
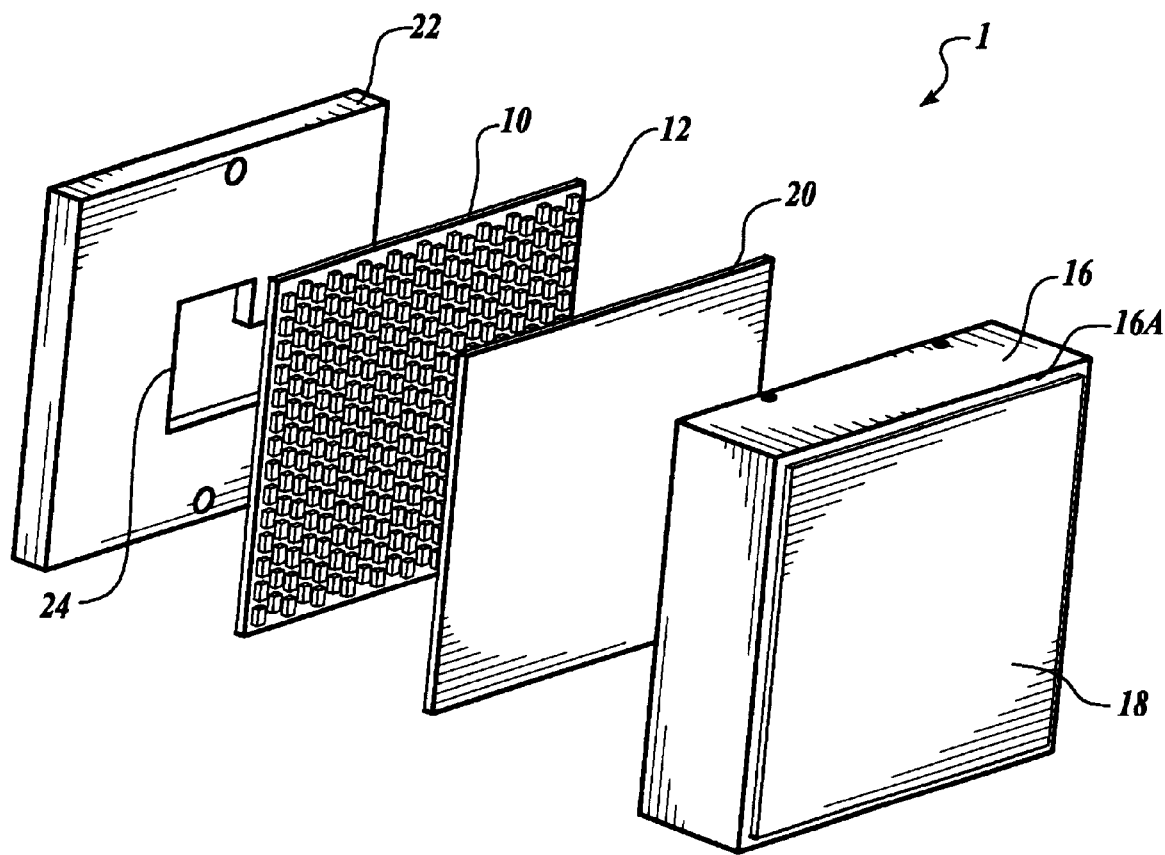
FIG. 2 is an exploded view of the LCD device of the invention from a direction opposite that shown in FIG. 1.

FIGS. 1 and 2 are exploded views of the LCD device 1 of the invention. LCD device 1 includes a printed circuit board, or PCB, 10. PCB 10 is generally an essentially flat panel having two mutually parallel opposing surfaces. Preferably, the surface on one side of PCB 10 has a white or other highly light-reflective surface finish deposited thereon. The highly light-reflective surface finish one side of PCB 10 is, for example, a high-gloss white paint or a shiny metallic layer, such as aluminum, copper, nickel, gold or another such metal.

The illumination source 12, best shown in FIG. 2, is formed on one side of PCB 10, preferably the side of PCB 10 bearing the above described light-reflective surface finish, if such surface finish is present. Illumination source 12 is preferably a large quantity of light emitting diodes, or LEDs. Such LED light sources are disclosed, for example, in U.S. Pat. No. 5,923,052, Light Emitting Diode, issued to Kim on Jul. 13, 1999, the complete disclosure of which is incorporated herein by reference.

The LED sources forming illumination source 12 are distributed across the majority of the surface of PCB 10 in a spatially uniform two-dimensional array, for example, as described in U.S. Pat. No. 5,621,225, Light Emitting Diode Display Package, issued to Shieh et al. on Apr. 15, 1997, the complete disclosure of which is incorporated herein by reference. As described in U.S. Pat. No. 5,621,225, illumination source 12 may include as many as 5,000 to 80,000 LED sources in spatially uniform orthogonal rows and columns. However, illumination source 12 according to the present invention is used for backlighting an LCD display and so requires fewer LED sources, which considerably simplifies the drive circuit. PCB 10 provides the connection or bond pads (not shown) to interconnect to the rows and columns of LED sources. The LEDs are soldered or bonded using conventional direct chip attach (DCA) bonding to the connection pads. PCB 10 also includes semiconductor chips 13 or other conventional circuits containing the driver and control electronics having control signal output terminals interfaced with the LED sources for activating illumination source 12 in accordance with control signals applied via input terminals from a control interface (not shown). Alternatively, the LED sources are integrated directly with the driver board, thereby minimizing size requirements for both the LED array and the driver, as described in above incorporated U.S. Pat. No. 5,621,225.

Illumination source 12 radiates light at a wavelength perceived by the human eye as white-colored light using a predetermined mixture of LEDs radiating light in all three primary colors, i.e., in the red, green and blue light bands. Until recently, the limitations in available colors, or wavelengths, radiated by commercially available LEDs dictated that white light was possible using LEDs only by mixing all three primary colors of LEDs, i.e. red, green and blue LEDs, the combination of which appears as white light to the viewer. For example, use of all three primary colors is used in a color display backlighted using florescent lamps, as disclosed in U.S. Pat. No. 4,924,215, Flat Panel Color Display Comprising Backlight Assembly And Ferroelectric Liquid Crystal Shutter Assembly, issued to Nelson on May 8, 1990, the complete disclosure of which is incorporated herein by reference. Thus, the present invention provides white light using an appropriate combination of differently colored LEDs, i.e., using a mixture of LEDs radiating the three primary colors. LEDs radiating at some wavelengths are more expensive than those radiating at others due to differences in the chemical ingredients and manufacturing processes required to cause florescence at the proper wavelength. Practicing the invention using a mixture of primary color LEDs reduces the cost savings normally available from mounting a large number of same colored LEDs in a circuit.

Alternatively, illumination source 12 uses a quantity of LEDs radiating white-colored light. According to another alternative embodiment, illumination source 12 includes a quantity of organic light emitting diodes, or OLEDs, similarly distributed in a spatially uniform two-dimensional array. Such OLED light sources are disclosed, for example, in U.S. Pat. No. 5,739,545, Organic Light Emitting Diodes Having Transparent Cathode Structures, issued to Guha et al. on Apr. 14, 1998, the complete disclosure of which is incorporated herein by reference. OLED light sources are similarly either a predetermined mixture of sources radiating in the red, green and blue light bands or a quantity sources radiating white-colored light.

An optional light level adjusting circuit 14, also known as a dimming circuit and referred to hereinafter as a brightness adjusting circuit, is electrically coupled to light source 12 for adjusting the illumination intensity. Brightness adjusting circuit 14 varies over a range the electrical power provided to illumination source 12. As is recognized by those of ordinary skill in the art, brightness adjusting circuit 14 for use with illumination source 12 formed of LED or OLED sources is a relatively simple circuit as compared with a light level adjusting circuit for use with florescent lamps. This less complex circuitry results in a dramatic cost reduction over the prior devices. Furthermore, the nature of LED and OLED sources is such that the light or radiation output is infinitely adjustable which results in a superior dimming or brightness control as compared with prior florescent devices. Brightness adjusting circuit 14 is generally coupled to a control interface (not shown), presented in either hardware or software, available for input by a display operator or viewer. Adjustment of brightness adjusting circuit 14 adjusts the display brightness to suit the viewer under different ambient light conditions. In a preferred embodiment, brightness adjusting circuit 14 is mounted on an opposing side of PCB 10 from illumination source 12. However, those of ordinary skill in the relevant art will recognize that brightness adjusting circuit 14 may be mounted elsewhere, even remotely from illumination source 12 and PCB 10. PCB 10 is sized to fit into an optical chamber 16 having a liquid crystal display panel, or LCD panel 18 mounted thereon. Typically, optical chamber 16 is rectangular in shape as shown, but the invention is equally applicable to chambers having a different shape, such as square, round, elliptical, or another suitable shape. Optical chamber 16 is provided with two substantially parallel mounting surfaces 16A and 16B which are spaced apart by the four side walls 16C, 16D, 16E and 16F forming optical chamber 16. PCB 10 is mounted to one of spaced apart parallel mounting surfaces 16A and 16B. Preferably, PCB 10 operates in optical chamber 16 having highly reflective surfaces, thus the interior surfaces of side walls 16C through 16F of optical chamber 16 are preferably formed with a highly light-reflective finish, similar to that described above in connection with PCB 10. Such reflective finish on the interior surfaces of optical chamber 16 increases the overall brightness and uniformity of the illumination by reflecting light rays directed toward the sidewalls of optical chamber 16 onto LCD panel 18.

Preferably, illumination source 12 includes sufficient quantities of light emitting diode sources, either LEDs or OLEDs, arranged in sufficiently close proximity to one another that the generated light is sufficiently bright and uniform to illuminate the display essentially uniformly at appropriate light levels. While illumination source 12 according to the present invention provides superior display uniformity, an optional optical diffuser panel 20 is provided between illumination source 12 and LCD panel 18 to ensure display uniformity, as described in U.S. Pat. No. 5,861,990, Combined Optical Diffuser And Light Concentrator, issued to Tedesco on Jan. 19, 1999, the complete disclosure of which is incorporated herein by reference. Optical diffuser panel 20, common in backlighted LCD devices, convert light from lamp segments or discrete sources into a more uniform glow across the surface of LCD panel 18. Such diffuser panels redirect incident radiation into multiple output rays that assist in filling the gaps otherwise visible between the discrete LED or OLED sources. The result is a more uniform illumination of LCD panel 18 over a relatively wide range of viewing angles. Optical diffuser panel 20 is particularly useful when the invention is practiced using a relatively low count of LED or OLED sources, whereby lamp segments or discrete sources are visually detectable in illumination source 12. Optical chamber 16 receives PCB 10 with the side having illumination source 12 mounted thereon facing toward LCD panel 18. If present, optional diffuser panel 20 is installed between PCB 10 and display 20.

LCD panel 18 is sized for mounting onto the other of two substantially parallel mounting surfaces 16A and 16B of optical chamber 16 opposite PCB 10. LCD panel 18 is of transmissive design, as is well known in the art. For example, LCD panel 18 is a conventional matrix type display using a light transmissive type of ferroelectric liquid crystal display formed of two transparent polarizers formed oppositely each other in crossed Nicols relationship with two transparent substrates arranged on the inner surfaces of the polarizers. Multiple parallel transparent conductive scanning electrode strips are formed on the inner surface of one transparent substrate and multiple orthogonally opposite parallel transparent conductive signal electrode strips are arranged on the inner surface of the opposing transparent substrate. A ferroelectric liquid crystal layer is formed between the transparent substrates and sealed therebetween. Drivers are connected respectively to the respective scanning electrodes for applying a voltage Vc thereto and drivers are connected respectively to the respective signal electrodes for applying a voltage Vs thereto. The orthogonally opposing scanning electrode strips and signal electrode strips overlap to form discrete picture elements, or pixels. The conventional backlighted LCD panel is operated by bringing different ones of the pixels into light transmissive and blocking states by applying the voltages Vc and Vs to corresponding electrodes. A particular pixel becomes transparent and passes the light generated by illumination source 12 when one of equations (1) or (2) is satisfied for a time period of T seconds, or longer.

$$Vc-Vs \geq Vth_1 \quad (1)$$

$$Vc-Vs \geq Vth_2 \quad (2)$$

where: $Vth_1$ and $Vth_2$ are threshold voltages of the liquid crystal and T is a real number greater than zero. In contrast, a particular pixel becomes opaque or blocks the transmission of light by satisfying the other one of equations (1) and (2) for a similar time period of T seconds, or longer. Thus, drive signals applied to a row and column activate a selected pixel. Such a conventional matrix type display using a light transmissive type of ferroelectric liquid crystal display is described, for example, as described in U.S. Pat. No. 5,103,328, Liquid Crystal Display Having Light Shutter Elements Disposed Between The Backlight Source And The Display Panel, issued to Numao on Apr. 7, 1992, the complete disclosure of which is incorporated herein by reference. The control circuit supplies the drive signals.

As is well known in the art, the output from LED light sources can vary substantially with temperature changes, being greatly reduced at elevated temperatures. The performance of many electronic components is similarly compromised at elevated temperatures. Consequently, preferred embodiments of the present invention include an optional heat sink device 22 for carrying heat generated by illumination source 12 and semiconductor chips 13 containing driver and control electronics. Heat sink 22 preferably forms a layered assembly with PCB 10 sandwiched between optical diffuser panel 20 and heat sink 22, illumination source 12 parallel and in close proximity to diffuser panel 20 and both semiconductor chips 13 and brightness control circuit 14 fitting into a cavity 24 formed in one face of heat sink 22. The layered assembly thus formed is mounted on one side of optical chamber 16 opposite and spaced away from LCD display 18. Alternatively, heat generated by illumination source 12 is dissipated using a common fan device (not shown). The fan is either formed in combination with the other elements of the liquid crystal display device of the invention, or as a separate cooling unit on an electronics enclosure upon which the liquid crystal display device is mounted.

While preferred embodiments of the invention have been described, variations and modifications will be obvious to those of ordinary skill in the relevant art. For example, heat sink 22 is not limited to flat plate shown. Heat sink 22 is optionally equipped with conventional heat dissipating fins on a surface opposite the mount to PCB 10 to promote more efficient cooling. In another example, the invention is equally applicable for use in automobile dashboards and aircraft cockpit displays. As suggested, the invention also has applications to many computing and entertainment applications where low cost liquid crystal displays are advantageous, for example, flat panel displays for laptop and palmtop computers. For at least these reasons, the invention is to be interpreted in light of the claims and is not limited to the particular embodiments described herein.

What is claimed is:

1. A backlighted low-profile liquid crystal display device, comprising:

an optical chamber having first and second opposing spaced apart faces;

a liquid crystal display mounted on one of said first and second faces of said optical chamber;

a printed circuit board having first and second essentially parallel surfaces, one of said first and second surfaces mounted to another of said first and second faces of said optical chamber;

a plurality of light emitting diodes arranged in a two-dimensional array across essentially the entirety of said one of said first and second surfaces of said printed circuit board mounted to said optical chamber for essentially direct backlighting of said liquid crystal display;

a brightness adjusting circuit disposed on said printed circuit board surface opposite said light emitting diodes;

a heat sink disposed adjacent to said printed circuit board surface opposite said light emitting diodes; wherein said brightness adjusting circuit is further disposed in a nested arrangement between said printed circuit board surface opposite said light emitting diodes and said heat sink.

2. The backlighted liquid crystal display device recited in claim 1, wherein said light emitting diodes radiate white light.

3. The backlighted liquid crystal display device recited in claim 2, wherein said light emitting diodes are arranged in combinations of light emitting diodes radiating in different ones of the three primary color bands, whereby said light emitting diodes generate white light.

4. The backlighted liquid crystal display device recited in claim 2, wherein each of said light emitting diodes radiates white colored light.

5. The backlighted liquid crystal display device recited in claim 2, further comprising an optical diffusion panel adjacent said light emitting diodes opposite said printed circuit board.

6. The backlighted liquid crystal display device recited in claim 2, wherein said one of said first and second surfaces of said printed circuit board having said plurality of light emitting diodes arranged thereon further includes a light-reflective finish formed thereon.

7. The backlighted liquid crystal display device recited in claim 2, wherein internal surfaces of said optical chamber are formed with a light-reflective finish.

8. A white backlighted low-profile liquid crystal display device, comprising:
   an optical chamber having two opposing spaced apart mounting surfaces;
   a conventional liquid crystal display mounted to one of said mounting surfaces of said optical chamber; and
   a layered illumination assembly mounted to a different one of said mounting surfaces of said optical chamber in an essentially direct backlighting relationship with said liquid crystal display, said layered illumination assembly including:
   a) a printed circuit board,
   b) a two-dimensional arrangement of light emitting diodes covering essentially one entire surface of said printed circuit board, said light emitting diodes radiating white colored light,
   c) a brightness adjusting circuit disposed on a printed circuit board surface opposite said light emitting diodes;
   d) a heat sink disposed adjacent to said printed circuit board surface opposite said light emitting diodes; wherein said brightness adjusting circuit is further disposed in a nested arrangement between said printed circuit board surface opposite said light emitting diodes and said heat sink.

9. The white backlighted liquid crystal display device recited in claim 8, wherein said layered illumination assembly further comprises an optical diffusion panel adjacent said light emitting diodes opposite said printed circuit board.

10. The while backlighted liquid crystal display device recited in claim 8, wherein said light emitting diodes further comprise a mixture of light emitting diodes radiating in different ones of red, green and blue light bands, whereby said mixture of light emitting diodes generates white light.

11. The white backlighted liquid crystal display device recited in claim 8, wherein each of said light emitting diodes radiates in the white light band.

12. In a low-profile liquid crystal display device, a layered illumination assembly in an essentially direct backlight relationship with a liquid crystal display panel, the layered illumination assembly, comprising:
   a printed circuit board;
   a two-dimensional arrangement of light emitting diodes mounted on one surface of said printed circuit board and essentially filling the entirety of said one surface, said light emitting diodes radiating white colored light essentially directly upon the liquid crystal display device;
   a brightness adjusting circuit disposed on a printed circuit board surface opposite said light emitting diodes;
   a heat sink disposed adjacent to said printed circuit board surface opposite said arrangement of light emitting diodes; wherein said brightness adjusting circuit is further disposed in a nested arrangement between said printed circuit board surface opposite said light emitting diodes and said heat sink.

13. The layered illumination assembly recited in claim 12, further comprising an optical diffusion panel adjacent said light emitting diodes opposite said printed circuit board.

14. The layered illumination assembly recited in claim 13, wherein said light emitting diodes further comprise a mixture of light emitting diodes radiating light in different ones of the three primary color bands, whereby white colored light is generated.

15. The layered illumination assembly recited in claim 13, wherein said light emitting diodes further comprise a plurality of light emitting diodes each radiating white colored light.

16. A method of backlighting a low-profile liquid crystal display panel with white light using light emitting diodes, the method comprising:
   mounting a liquid crystal display panel on a first surface of an optical chamber;
   mounting a plurality of light emitting diodes in a two-dimensional array essentially covering the surface of a printed circuit board, said light emitting diodes generating an essentially white colored light;
   mounting said printed circuit board on a second surface of said optical chamber in an essentially direct backlighting relationship to and spaced away from said liquid crystal display panel;
   mounting a heat dissipating device in layered relationship with said printed circuit board on a side of said printed circuit board opposite to said light emitting diodes;
   mounting a brightness adjusting circuit on said printed circuit board side opposite said light emitting diodes and further disposed in a nested arrangement between said printed circuit board surface opposite said light emitting diodes and said heat sink; and
   backlighting said liquid crystal display panel with essentially uniform illumination.

17. The method recited in claim 16, further comprising mounting an optical diffusing device in layered relationship with said printed circuit board and said heat dissipating device on a side of said printed circuit board opposite said light emitting diodes.

18. The method recited in claim 17, wherein said plurality of light emitting diodes is a mixture of light emitting diodes radiating in different ones of red, blue and green light bands.

19. The method recited in claim 17, wherein said plurality of light emitting diodes each radiate light in a white colored light band.

* * * * *